(12) United States Patent
Sakama et al.

(10) Patent No.: US 7,535,365 B2
(45) Date of Patent: May 19, 2009

(54) RADIO FREQUENCY IC TAG AND METHOD FOR MANUFACTURING SAME

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 11/304,776

(22) Filed: Dec. 16, 2005

(65) Prior Publication Data

US 2006/0244604 A1    Nov. 2, 2006

(30) Foreign Application Priority Data

Apr. 28, 2005    (JP)    ............... 2005-132771

(51) Int. Cl.
*G08B 13/14*    (2006.01)

(52) U.S. Cl. .................. 340/572.7; 340/572.1

(58) Field of Classification Search ............ 340/572.7, 340/825.54, 572.1, 572.8, 693.5
See application file for complete search history.

(56) References Cited

U.S. PATENT DOCUMENTS

| | | | | |
|---|---|---|---|---|
| 4,965,290 A | * | 10/1990 | Hoshiko | ............ 521/54 |
| 6,104,311 A | * | 8/2000 | Lastinger | ............ 340/10.51 |
| 6,121,878 A | | 9/2000 | Brady | |
| 6,278,413 B1 | | 8/2001 | Hugh | |
| 2003/0011522 A1 | * | 1/2003 | McKinzie et al. | ..... 343/700 MS |
| 2004/0175573 A1 | * | 9/2004 | Fujihana | ............ 428/423.1 |
| 2005/0007296 A1 | * | 1/2005 | Endo et al. | ............ 343/895 |
| 2005/0269121 A1 | * | 12/2005 | Ikeda et al. | ............ 174/58 |

FOREIGN PATENT DOCUMENTS

| | | |
|---|---|---|
| EP | 0 977 145 | 2/2000 |
| EP | 1 522 950 | 4/2005 |
| JP | 2003-298464 | 10/2003 |

* cited by examiner

*Primary Examiner*—Daniel Wu
*Assistant Examiner*—Shirley Lu
(74) *Attorney, Agent, or Firm*—Antonelli, Terry, Stout & Kraus, LLP.

(57) ABSTRACT

A radio frequency IC tag is provided which is excellent in weatherability, dustproofness, waterproofness, and static protection and capable of making a communication distance long even though each antenna section is made small in configuration. A first antenna equipped with an IC chip is formed on an upper surface of a first spacer. A second antenna is formed on a lower surface of a top cover. A second spacer is shaped in hollow form. The first spacer and the top cover are disposed on both sides of the second spacer with the first antenna and the second antenna being opposite to each other. Each of the first spacer, the second spacer and the top cover is formed of a synthetic resin. Thus, the IC chip and each antenna section are not exposed to the outside and hence weatherability is enhanced.

19 Claims, 4 Drawing Sheets

RADIO FREQUENCY IC TAG AND METHOD FOR MANUFACTURING SAME

CLAIM OF PRIORITY

The present application claims priority from Japanese application JP 2005-132771, filed on Apr. 28, 2005, the content of which is hereby incorporated by reference into this application.

BACKGROUND OF THE INVENTION

The present invention relates to a radio frequency IC tag comprising an IC chip with information recorded thereon and an antenna for radio transmitting the information recorded on the IC chip by radio waves, and particularly to a radio frequency IC tag improved in durability and weatherability and a method for manufacturing the radio frequency IC tag.

In recent years, radio frequency IC tags have been widely used in information management and physical distribution management or the like of articles. Further, these radio frequency IC tags are beginning to be used even when animals and the like are specified and managed. Each of such radio frequency IC tags comprises a small IC chip with information recorded thereon and a small antenna which transmits the information of the IC chip by radio. Such a radio frequency IC tag has, for example, a small IC chip having dimensions: about 0.4 mm (width)×0.4 mm (depth)×0.1 mm (height), which is mounted to the neighborhood of a central portion of a slender antenna, and is used with being attached to each of articles, animals and the like. Thus, information (i.e., information about the attributes or the like of individual articles and animals) recorded on the IC chip can be read on a non-contact basis by holding a read writer over the corresponding radio frequency IC tag.

In order to attach such radio frequency IC tags on the articles and animals or the like, the radio frequency IC tags may preferably be set as small as possible and be light in weight. Further, a communication distance may preferably be set as long as possible. To this end, there is a need to reduce the antenna of each radio frequency IC tag and make its directivity satisfactory. When the radio frequency IC tags are mounted to articles and livestock or the like exposed to the outdoors, they need to be excellent in durability, weatherability, dustproofness, moistureproofness and the like. A technique of a radio frequency IC tag wherein an antenna section is accommodated in a dielectric case to realize such an objective, has been disclosed (for example, Japanese Patent Laid-Open No. 2003-298464 (refer to paragraph numbers 0067 through 0071 and FIG. 6)). This technique shows a configuration wherein a microstrip antenna in which a radiation conductive layer (antenna layer) and an earth conductive layer (ground layer) are formed on both sides of a dielectric, is nipped by a case formed of a dielectric material such as polypropylene relatively low in dielectric loss. Thus, since the antenna section containing the IC chip is covered with the case, it is excellent in weatherability and excellent even in dustproofness.

BRIEF SUMMARY OF THE INVENTION

Since, however, the radio frequency IC tag of the patent document 1 referred to above makes use of a general synthetic resin foam as a dielectric case, a moisture-proof effect might be impaired due to moisture-absorbent action, and the dielectric case might be deformed or cracked due to ultraviolet rays and raindrops or the like. That is, there may be cases in which weatherability, dustproofness, waterproofness and the like are impaired due to deterioration of the synthetic resin foam over time. Further, when the radio frequency IC tag is used in a clean room or the like at a semiconductor manufacturing site, the degree of cleanness might be degraded due to dust generation or the like from the synthetic resin foam, and semiconductor products might be subjected to electrostatic breakdown due to an electrostatic charge phenomenon of the synthetic resin foam. Consequentially, there is a fear that the production yields of the semiconductor products are reduced. Incidentally, since one of such a type that the antenna section is covered with the conventional radio frequency IC tag of such a type as described in the patent document 1 takes such a configuration that it is nipped by a general resin case, as well as the radio frequency IC tag of the patent document 1, it does not take sufficient measures against weatherability, dustproofness, waterproofness and electrostatic prevention or the like.

Since the radio frequency IC tag of the patent document 1 takes the configuration using the microstrip antenna, the radio wave of the IC chip is efficiently radiated from the radiation conductive layer (antenna layer) side without being radiated to the earth conductive layer (ground layer). Therefore, the directivity of the antenna is relatively satisfactory. Since, however, the areas of the radiation conductive layer (antenna layer) and the earth conductive layer (ground layer) must be increased to further strengthen the strength of the radio wave radiated from the microstrip antenna, the radio frequency IC tag will eventually increase in size.

The present invention has been made in view of the above problems. It is therefore an object of the present invention to provide a radio frequency IC tag which is excellent in weatherability, dustproofness, waterproofness, static protection and the like and capable of making a communication distance long even though an antenna section is made small in configuration, and a method for manufacturing the same.

A radio frequency IC tag of the present invention has been created to attain the above object. A first antenna to which an IC chip is mounted, and a second antenna which amplifies a radio wave radiated from the first antenna, are disposed on their corresponding opposite surfaces inside a case. A hollow portion defined between the first antenna and the second antenna is brought into a vacuum state or filled with air, inert gas, a synthetic resin or synthetic resin foam to form a dielectric layer. As a material for the case, high-strength resins such as ABS (Acrylonitrile-Butadiene-Styrene resin), AES (Acrylonitrile-Ethylene-Styrene), AS (Acrylonitrile-Styrene copolymer), PC (PolyCarbonate), POM (PolyOxyMethylene), etc. are used. Alternatively, antistatic polypropylene antistatic ABS formed by adding conductive high polymer or the like to an ABS resin, a resin used in a semiconductor manufacturing process line, etc. are used. As an alternative to above, a fluorocarbon resin high in chemical resistance is used. Mounting openings are provided at case ends or mounting grooves are provided thereat to configure a structure easy to mount the radio frequency IC tag to an object to be attached.

According to the present invention, the first antenna and the second antenna are configured so as to be accommodated within the case inclusive of the IC chip to thereby enhance durability and weatherability against the environment. Using electrostatically-uncharged static-controlled material as a material for forming the case makes it possible to reduce an electrostatic charge phenomenon to the radio frequency IC tag and prevent dust generation due to deterioration with time. Further, since the second antenna for amplifying the radiated radio wave of the first antenna is provided, the radio wave radiated from the radio frequency IC tag becomes strong, so that a communication distance from the radio frequency IC tag can be made long.

BRIEF DESCRIPTION OF THE DRAWINGS

FIGS. 4A and 4B are perspective views showing a radio frequency IC tag according to a second embodiment of the present invention, wherein FIG. 4A shows a shape having mounting openings and FIG. 4B shows a shape having mounting grooves.

DETAILED DESCRIPTION OF THE INVENTION

<Summary of the Invention>

A radio frequency IC tag according to the best mode (hereinafter called "embodiment") for implementing the present invention will hereinafter explained with reference to the accompanying drawings by citing preferred examples.

In the radio frequency IC tag according to the present invention, a first antenna equipped with an IC chip is disposed with respect to an inner surface on the bottom side, of a case made of a synthetic resin, and a second antenna that resonates with a radiated radio wave of the first antenna is disposed with respect to an inner surface on the cover side, of the case. Incidentally, a high-strength material excellent in impact resistance, a chemical-resistance material excellent in chemical resistance, an antistatic or static-controlled material free of the occurrence of static electricity and the like are selected and used for the case. A hollow portion in the case is brought to a vacuum state or filled with air, an inert gas, synthetic resin foam or the like to form a dielectric layer. With such a configuration, the strength of the radiated radio wave becomes strong by virtue of an amplifying effect produced by the second antenna and hence a communication distance gets long. Further, the IC chip, the antennas and the like are accommodated into the case to make it possible to enhance durability, weatherability, dustproofness and waterproofness. Since the synthetic resin of the case makes use of the static-controlled material, an electrostatic charge phenomenon can also be prevented from occurring.

FIRST PREFERRED EMBODIMENT

Figure 1:
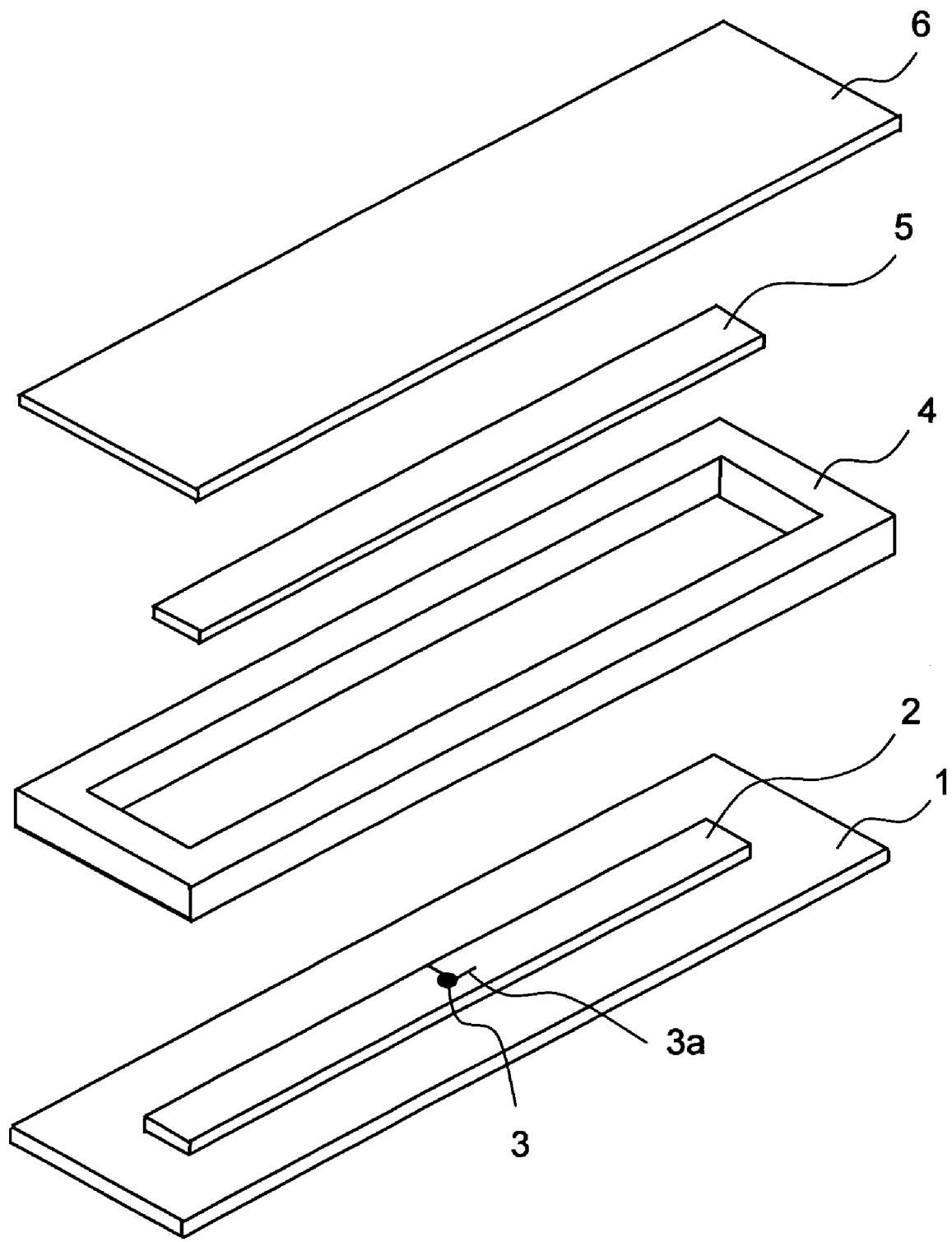
FIG. 1 is an exploded view of a radio frequency IC tag showing a first embodiment according to the present invention.
Figure 2:
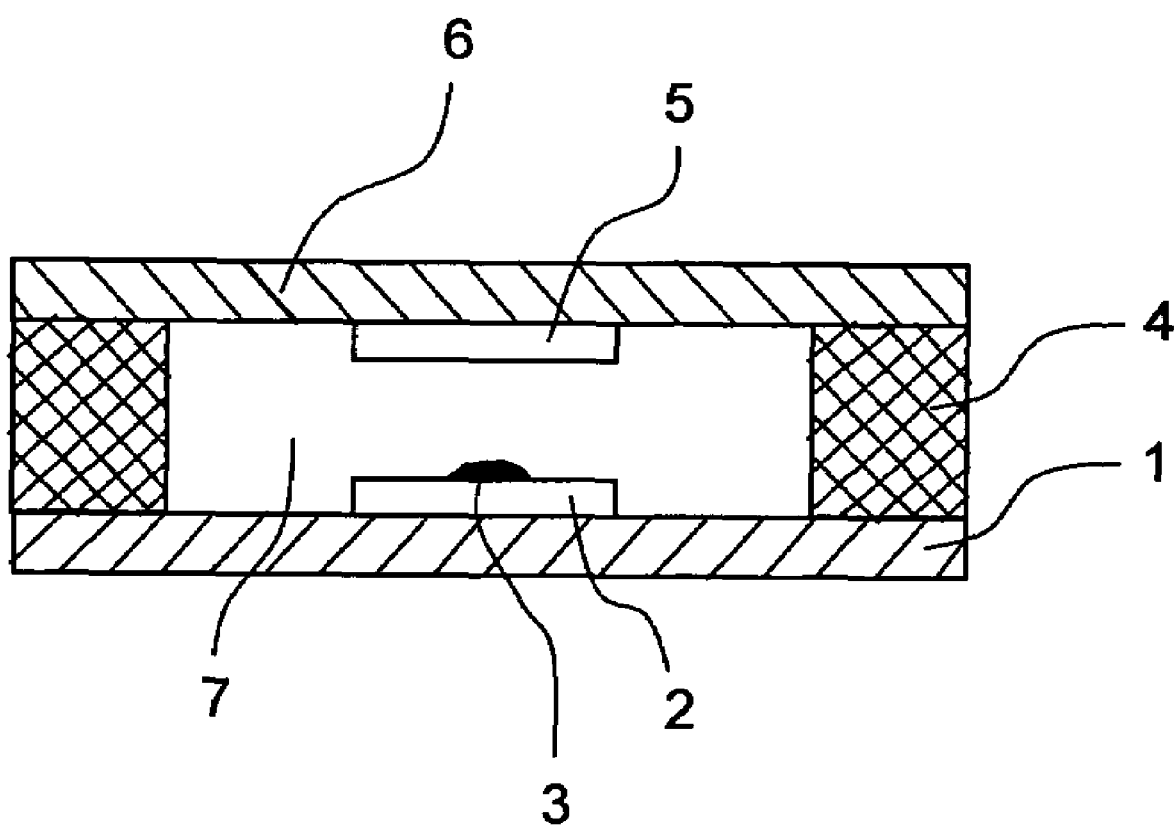
FIG. 2 is a sectional view of the radio frequency IC tag assembled in FIG. 1 as viewed in its transverse direction.

FIG. 1 is an exploded view of a radio frequency IC tag according to a first embodiment of the present invention. FIG. 2 is a sectional view of the radio frequency IC tag assembled in FIG. 1 as viewed in its transverse direction. As shown in FIG. 1, a copper foil-made first antenna 2 given tin plating or the like is formed on an upper surface of a plate-shaped first spacer 1 made up of a synthetic resin such as a polyimide resin material or the like. An IC chip 3 with information recorded thereon is mounted on an upper surface of the first antenna 2. A slit 3a for impedance matching and prevention of electrostatic breakdown of the IC chip is formed at a part where the IC chip 3 is mounted on the first antenna 2.

A copper foil-made second antenna 5 given the same tin plating or the like is formed on a lower surface of a top cover 6. A second spacer 4 is shaped in a hollow form having a predetermined thickness. The top cover 6 and the first spacer 1 are provided on both sides of the second spacer 4 in a state in which the first antenna 2 and the second antenna 5 are opposed to each other on both sides thereof. Thus, the top cover 6, the first spacer 1 and the second spacer 4 constitute the case which accommodates the IC chip 3 and the first and second antennas 2 and 5 therein. The thickness of the second spacer 4 defines space between the first antenna 2 and the second antenna 5. Incidentally, the first antenna 2 and the second antenna 5 can also be formed by being metallized or metal-deposited directly on the first spacer 1 and the top cover 6 respectively.

The radio frequency IC tag is formed by assembling the respective members in this way. FIG. 2 is a view showing a sectional configuration of the radio frequency IC tag as viewed in its transverse direction. As shown in FIG. 2, the first antenna 2 which radiates the information of the IC chip 3 through the use of a weak radio wave, and the second antenna 5 which performs an amplifying operation in resonance with the weak radio wave of the first antenna 2, are disposed in opposing relationship with a hollow portion 7 of the second spacer 4 as a dielectric. Thus, if the radio frequency IC tag is mounted with the first spacer 1 side as a body for an object, then management or control of the object can be carried out since the information of the IC chip 3 is read by receiving the radio wave radiated from the second antenna 5. Since the first spacer 1 keeps the first antenna 2 away from the object at a predetermined distance in a state in which the radio frequency IC tag is being mounted to the object, the radio wave can be radiated even if the object is a metal or one containing moisture. Thus, the radio frequency IC tag according to the present embodiment can be used with being mounted to a wafer or a metal or the like even in a semiconductor manufacturing process which needs chemical resistance, dustproofness and an antistatic or static-controlled property.

In order to effectively propagate the weak radio wave radiated from the first antenna 2 to the second antenna 5, there is a need to suppress the thickness of the second spacer 4, i.e., the thickness T of the hollow portion 7 from 0.3 mm or over to 5 mm or under. When the hollow portion 7 is air (that is, when air becomes a dielectric), the thickness T may most preferably be 1 mm or so. Incidentally, the thickness of the first spacer 1 and the thickness of the top cover 6 are respectively set so as to range from about 0.1 mm to about 2 mm. No particular restrictions are imposed on the dimensions or sizes in the transverse and longitudinal directions, of the first spacer 1, second spacer 4 and top cover 6. The dimensions thereof may appropriately be determined depending upon dimensions easy to manufacture them and each object to which the radio frequency IC tag is mounted.

Although the first antenna 2 and the second antenna 5 are formed of copper foil, they are not limited to it. They may also be formed of aluminum foil, conductive ink (one obtained by kneading ink with a carbon resin) or the like. The thicknesses of the first antenna 2 and the second antenna 5 are set to, for example, about 0.02 mm and the lengths thereof are set to 53 mm due to the reason to be described later. Incidentally, no particular restriction is imposed on the width of the second antenna 5.

That is, the radio frequency IC tag of the present invention is configured in such a manner that the first antenna 2 equipped with the IC chip 3 and the second antenna 5 for amplifying the radio wave radiated from the first antenna 2 are placed in opposing relationship in the case constituted of the first spacer 1, the second spacer 4 and the top cover 6, and the hollow portion 7 existing between the first antenna 2 and the second antenna 5 is brought into the vacuum state or airspace or filled with the inert gas such as nitrogen, argon or the like to form the dielectric layer of desired permittivity. The dielectric layer of desired permittivity can also be formed by charging the hollow portion 7 with a synthetic resin or synthetic resin form instead of air or the like. Incidentally, when the hollow portion 7 is filled with the gas or synthetic resin, the strength of the entire radio frequency IC tag can be increased.

As the material for the first spacer 1, the second spacer 4, and the top cover 6, high-strength resins such as ABS, AES, AS, PC, POM and the like are used.

Of these high-strength resins, ABS is a hard and high strength resin which is strong in impact and has strong resistance to an acid, a base, salt water, alcohol and the like. PC (polycarbonate) is excellent in impact resistance and excellent in terms of resistance to a weak acid, a base, oil, alcohol and the like at room temperatures. Further, POM (polyoxymethylene) is an engineering plastic material excellent in terms of strength, elastic modulus, impact resistance and the like.

In particular, a POM resin (polyoxymethlene, polyacetal or the like) is engineering plastic excellent in terms of mechanical characteristics such as a breaking strength or the like, and wear resistance characteristics or the like. Homopolymer and copolymer are known as the POM resin. Since there are differences in strength, heat resistance, molding conditions and the like between the homopolymer and the copolymer, the POM resin may preferably be used properly according to mounting uses or the like for the radio frequency IC tag. Since the most striking characteristic of the POM resin is self-lubricative, it has characteristics useful in the use for parts always subjected to friction as in gear wheels, bearings and the like. Therefore, the POM resin may preferably be used for the radio frequency IC tag applied to such uses that the characteristics can be utilized effectively. Further, since the POM resin is also high in crystallinity, it exhibits characteristics satisfactory in strength and heat resistance too. Incidentally, caution is required since it causes thermal decomposition when it stays in a cylinder for long hours upon injection molding.

As the material for the first spacer 1, the second spacer 4, and the top cover 6, antistatic polypropylene, antistatic ABS obtained by adding conductive high polymer or the like to the normal ABS resin, a resin used in a manufacturing process line of semiconductor materials such as silicon, and the like are used. That is, although the static-controlled materials each having the antistatic effect are used as the material for the second spacer 4, these static-controlled materials can be allowed to have the antistatic effect by being added with the conductive high polymer upon polymerization of a high-purity ABS resin. By using a material for a wafer carrier used in a semiconductor manufacturing line, an antistatic effect corresponding to low dust generation can be obtained.

As the material for the first spacer 1, the second spacer 4, and the top cover 6, a fluorocarbon resin can be used to enhance chemical resistance. As the fluorocarbon resin having the chemical resistance, for example, PFA (Pefluoroalkoxy: Perfluoroalkilvinylether copolymer resin) has high chemical resistance and solvent resistance. In order to cause it to have chemical resistance, materials other than the fluorocarbon resin, such as PP (Polypropylene), PEEK (Polyetheretherketone), PPS (PolyPhenilen Sulfid), etc. can also be used. PP is excellent in bending characteristic and shock resistance and has chemical resistance excellent in strong inorganic acid, base, and alcohol and the like. PEEK exhibits chemical resistance high both inorganically and organically. Further, PPS has a heat resistance of 200° C. and is extremely satisfactory in dimensional stability. PPS is excellent in acid resistance and alkali resistance and resistant to organic solvents, and is excellent even in chemical resistance.

In particular, PPS (PolyPhenilen Sulfid) used as the chemical resistance material is super engineering plastic which endures up to the neighborhood of 260° C. corresponding to a deflection temperature under load. As such PPS, there are known cross-linked, semicross-linked and straight-chain types. Since the deflection temperature under load thereof is higher than a melting-point temperature of solder, PPS is preferably used in surface-mount electronic parts for reflow solder. Thus, it is desirable to use PPS in the radio frequency IC tag applied to such uses that such characteristics can be utilized effectively. Incidentally, since PPS is good in fluidity, burrs are apt to occur upon injection molding. Since it is necessary to raise a molding temperature at the molding of PPS from 130° C. to 150° C., a mold therefor needs an oil-based temperature adjustment and heat retention by a cartridge heater.

The relationship between the length of the second antenna 5 and its communication distance will next be explained. The first antenna 2 propagates the information of the IC chip 3 to the second antenna 5 by a weak radio wave. In doing so, the second antenna 5 exhibits amplifying action in resonance with the frequency of the radio wave radiated from the first antenna 2. As a result, the amplified radio wave is radiated from the second antenna 5 to the outside and hence the radio wave strong in radio field intensity is radiated to make it possible to keep the communication distance long. Since a resonant point changes according to the length of the second antenna 5 at this time, the length of the second antenna 5 becomes an important factor for increasing the communication distance. It is of course needless to say that the length of the resonating second antenna 5 differs according to the permittivity of a dielectric charged into the hollow portion 7.

Figure 3:
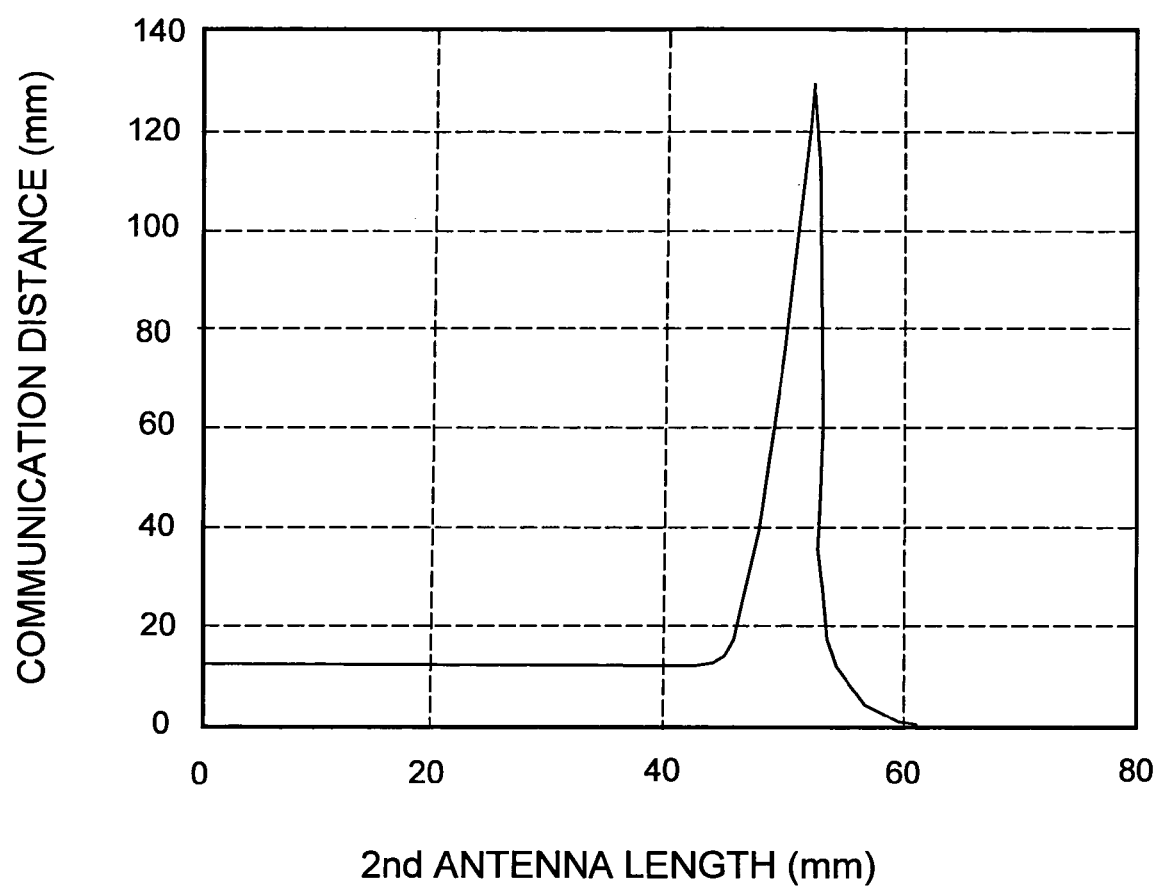
FIG. 3 is a characteristic diagram showing an experimental result in which communication distances relative to the length of a second antenna where the permittivity of a dielectric interposed between a first antenna and the second antenna is held constant have been measured, in the radio frequency IC tag in FIG. 2.

FIG. 3 is a characteristic diagram showing an experimental result in which communication distances relative to the length of the second antenna where the permittivity of the dielectric interposed between the first antenna and the second antenna is held constant, have been measured, in the radio frequency IC tag in FIG. 2. Although the communication distance is kept constant as about 12 mm as shown in FIG. 3 until the length of the second antenna 5 is at about 45 mm, the communication distance suddenly increases from the length exceeding 45 mm when the length of the second antenna 5 is increased. When the second antenna 5 is set to a length of 53 mm, the communication distance reaches about 130 mm at maximum. That is, the point where the length of the second antenna 5 reaches 53 mm becomes the resonant point relative to the radiated radio wave of the first antenna 2. When the length of the second antenna 5 is further increased, the communication distance suddenly becomes short in reverse. When a length of about 60 mm is reached, the radio frequency IC tag is brought into a state unable to entirely communicate (communication distance: 0). In the first embodiment, 53 mm at which the communication distance becomes the longest, was set to the length of the second antenna 5 on the basis of the experimental result.

It is theoretically known that when the length of the second antenna 5 is set to ½ (i.e., $\lambda/2$) of the wavelength of a radio wave of a predetermined frequency (2.45 GHz) used to read the information from the radio frequency IC tag, the communication distance becomes the longest. However, the length thereof changes according to the permittivity of a substance charged between the first antenna 2 and the second antenna 5, and the like. When an insulating material large in permittivity is used as the charged substance, the length of the second antenna 5 can be shortened. It is known that when, for example, chloroburane rubber is used as the charged insulating material although an experimental result is not shown in the drawing, the length of the second antenna 5 can be shortened from 53 mm referred to above to 45 mm.

Thus, the communication distance and the length of the second antenna 5, and the permittivity of the insulating material charged between the first antenna 2 and the second antenna 5 are placed in a trade-off relationship. Therefore, the radio frequency IC tag can be realized which is capable of combining both thinning thereof owing to the addition of the second spacer 4 and the second antenna 5 and shortening of the dimensions in the longitudinal direction due to the shortening of the second antenna 5 by selecting the insulating material of suitable permittivity and filling the hollow portion 7 with it, and of ensuring a relatively long communication distance. Since the length of the first antenna 2 can also be set to the same length of 45 mm as that of the second antenna 5 in the above example, the dimensions in the longitudinal direction can be shortened along with the thinning. Consequentially, miniaturization of the radio frequency IC tag can be realized.

Using the high-strength material, chemical resistant material and static-controlled material for the first spacer 1, second spacer 4 and top cover 6 constituting the case of the radio frequency IC tag as described above makes it possible to enhance durability, weatherability, dustproofness and waterproofness and prevent the electrostatic charge phenomenon. Further, the permittivity between the first antenna 2 and the second antenna 5 can arbitrarily be changed by bringing the hollow portion 7 to vacuum, filling the hollow portion 7 with air or inert gas or interposing the resin into the hollow portion 7 to form the dielectric. Changing the permittivity in this way makes it possible to arbitrarily change radio wave propagation efficiency between the first antenna 2 and the second antenna 5. Consequentially, the strength of the radio wave radiated from the second antenna 5 can arbitrarily be changed.

When the dielectric interposed in the hollow portion 7 of the second spacer 4 is of vacuum or air, for example, the permittivity is approximately "1". Since, however, the permittivity ranges from "2 to 4" if the synthetic resin foam is interposed therein, the communication distance can be made long even though the thickness T of the second spacer 4 is made thin. Since the permittivity can selectively be changed even in the case of the same material by changing a foam rate of the synthetic resin foam, the communication distance can be controlled by changing the foam rate. That is, when the synthetic resin foam is provided as the dielectric, its permittivity results in permittivity of its synthetic resin itself where the foam rate is "0%". As the foam rate approaches "100%", its permittivity can be made close to air's permittivity "1."

SECOND PREFERRED EMBODIMENT

Figure 4A:
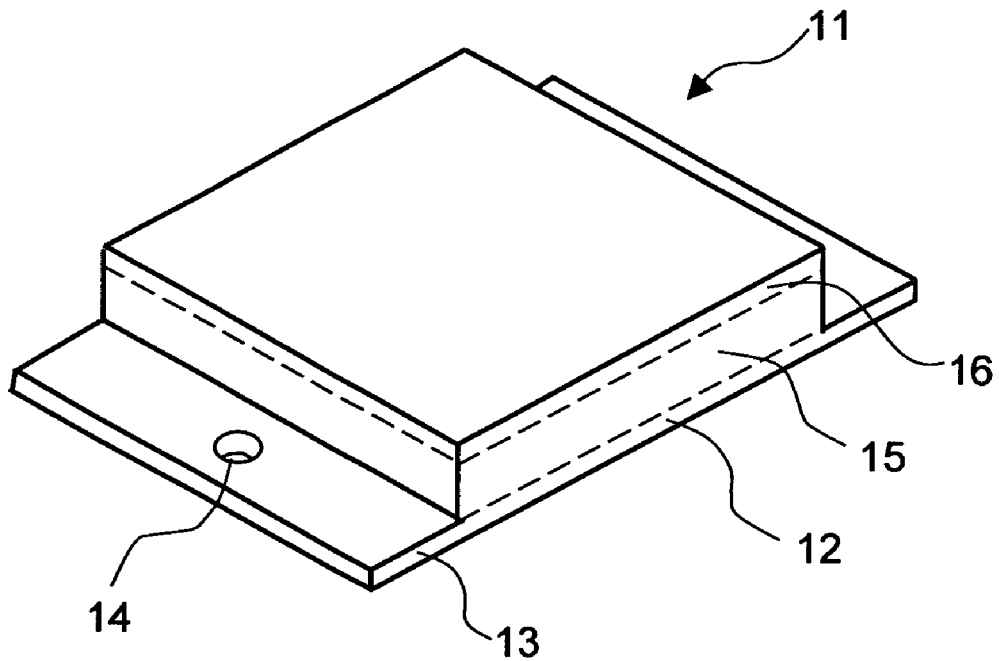
Figure 4B:
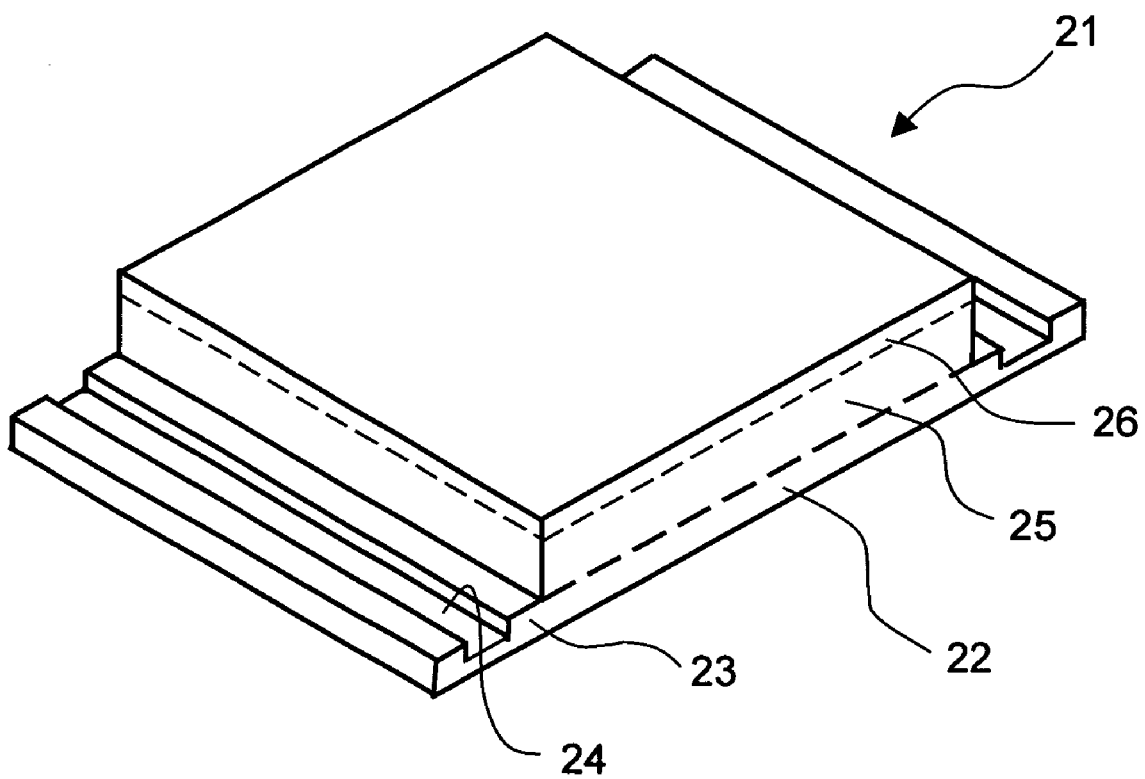

A second embodiment of the present invention will explain a mounting structure of a radio frequency IC tag. FIGS. 4A and 4B are perspective views of the radio frequency IC tag according to the second embodiment of the present invention, wherein FIG. 4A shows a shape having mounting openings, and FIG. 4B shows a shape having mounting grooves, respectively. The first spacer 1 and the top cover 6 are formed in the same size in the first embodiment, whereas a first spacer 12 is made longer than a top cover 16 as viewed in a longitudinal direction in the second embodiment. Thus, when a second spacer 15 and the top cover 16 are disposed on the first spacer 12 as shown in FIG. 4A, ends 13 are formed on both sides. The mounting openings 14 are defined in the ends 13 respectively. It is thus possible to easily mount the radio frequency IC tag 11 onto an object to be mounted. Since the radio frequency IC tag 11 has durability, weatherability, dustproofness and waterproofness and is given antistatic measures, it is possible to mount the radio frequency IC tag to a container, a cylinder and a power apparatus or the like exposed to the outdoors and control or manage information about those mounted objects.

As shown in FIG. 4B, ends 23 can be formed on both sides by making a first spacer 22 longer than a top cover 26 as viewed in a longitudinal direction in a manner similar to FIG. 4A. Forming the mounting grooves 24 at the ends 23 makes it possible to easily mount the radio frequency IC tag 21 to an object to be mounted. Since the present radio frequency IC tag 21 has durability, weatherability, dustproofness and waterproofness and is given antistatic measures, it is possible to mount a waste management apparatus exposed to the outdoors and a semiconductor material or the like manufactured in a clean room, manage information about those objects to be mounted and thereby carry out process control.

In general, charged electrical charges are hard to scatter because a synthetic resin such as plastic is high in electrical insulating property. Therefore, there is a fear that dust is adhered to a synthetic resin product to cause its depreciation, instruments and an IC chip are caused to malfunction due to the electrical charges and a semiconductor product is subjected to an electrostatic breakdown. Since, however, the radio frequency IC tag according to the present invention has waterproofness, weatherability and resistance to dust and is brought to a rugged structure, it is possible to mount it to a transporter and an outdoor power apparatus or the like and perform their operational management or the like. Since the radio frequency IC tag according to the present invention is provided with the antistatic property hard to take the electrical charge, manufacturing management high in production yield can be carried out by using the radio frequency IC tag in a semiconductor manufacturing apparatus or the like.

What is claimed is:

1. A radio frequency IC tag which transmits information recorded on an IC chip by radio, comprising:
    a first antenna which is equipped with the IC chip and transmits the information recorded on the IC chip by radio waves;
    a second antenna to amplify a radio wave radiated from the first antenna to produce an amplified radio wave and to radiate the amplified radio wave to transmit the information recorded on the IC chip by radio; and
    a hollow case,
    wherein the first antenna and the second antenna are respectively placed to face one another in opposing positions with a predetermined distance therebetween inside the hollow case.

2. The radio frequency IC tag according to claim 1,
    wherein a material for the case is any of ABS (Acrylonitrile-Butadiene-Styrene resin), AES (Acrylonitrile-Ethylene-Styrene), AS (Acrylonitrile-Styrenecopolymer), PC (PolyCarbonate) and POM (Polyoxymethylene) or a high-strength resin having performance equivalent to them.

3. The radio frequency IC tag according to claim 1,
    wherein a material for the case is any of antistatic polypropylene, antistatic ABS (Acrylonitrile-Butadiene-Styrene resin) obtained by adding conductive high polymer to an ABS resin and a resin used in a semiconductor manufacturing process line.

4. The radio frequency IC tag according to claim 1, wherein a material for the case is a fluorocarbon resin.

5. The radio frequency IC tag according to claim 4, wherein a material for the case is any of PP (Polypropylene), PEEK (Polytheretherketone), PFA (Pefluoroalkoxy: Perfluoroalkilvinylether copolymer resin) and PPS (PolyPhenilen Sulfid).

6. The radio frequency IC tag according to claim 1, wherein mounting openings are respectively provided at ends of the case.

7. The radio frequency IC tag according to claim 1, wherein mounting grooves are respectively provided at ends of the case.

8. The radio frequency IC tag according to claim 1, wherein the first antenna and the second antenna are substantially parallel to one another in a longitudinal direction along which the first antenna and the second antenna extend.

9. The radio frequency IC tag according to claim 8, wherein a length of the second antenna is set in accordance with a permittivity of a hollow portion of the hollow case.

10. The radio frequency IC tag according to claim 8, including means for shortening a length of the second antenna without reducing amplification of the radio wave, said means comprising setting a length of the second antenna in accordance with a permittivity of a hollow portion of the hollow case.

11. The radio frequency IC tag according to claim 8, wherein said predetermined distance is between 0.3 mm and 5 mm.

12. The radio frequency IC tag according to claim 1, wherein a length of the second antenna is set in accordance with a permittivity of a hollow portion of the hollow case.

13. The radio frequency IC tag according to claim 12, wherein the case is placed in a vacuum state thereinside.

14. The radio frequency IC tag according to claim 12, wherein the case is internally filled with air or an inert gas.

15. The radio frequency IC tag according to claim 12, wherein a synthetic resin foam is charged between the first antenna and the second antenna in the case.

16. The radio frequency IC tag according to claim 15, wherein desired permittivity is obtained by changing a foam rate of the synthetic resin foam.

17. The radio frequency IC tag according to claim 12, wherein said predetermined distance is between 0.3 mm and 5 mm.

18. The radio frequency IC tag according to claim 1, including means for shortening a length of the second antenna without reducing amplification of the radio wave, said means comprising setting a length of the second antenna in accordance with a permittivity of a hollow portion of the hollow case.

19. The radio frequency IC tag according to claim 1, wherein said predetermined distance is between 0.3 mm and 5 mm.

* * * * *